United States Patent
Sorenson et al.

(10) Patent No.: US 10,838,625 B2
(45) Date of Patent: Nov. 17, 2020

(54) I/O RESPONSE TIMES IN DATA REPLICATION ENVIRONMENTS

(71) Applicant: International Business Machines Corporation, Armonk, NY (US)

(72) Inventors: Todd C. Sorenson, Tucson, AZ (US); Karl A. Nielsen, Tucson, AZ (US); Jacob L. Sheppard, Corona De Tucson, AZ (US); Sean P. Riley, Tucson, AZ (US); Larry Juarez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 16/153,727

(22) Filed: Oct. 6, 2018

(65) Prior Publication Data
US 2020/0110541 A1    Apr. 9, 2020

(51) Int. Cl.
*G06F 3/00* (2006.01)
*G06F 3/06* (2006.01)
(Continued)

(52) U.S. Cl.
CPC .......... *G06F 3/0611* (2013.01); *G06F 3/0655* (2013.01); *G06F 3/0673* (2013.01);
(Continued)

(58) Field of Classification Search
None
See application file for complete search history.

(56) References Cited

U.S. PATENT DOCUMENTS 5,758,057 A * 5/1998 Baba .................. G06F 11/0727
                                                711/114
7,058,731 B2   6/2006 Kodama
(Continued)

FOREIGN PATENT DOCUMENTS

WO    WO0173554 A2    10/2001

OTHER PUBLICATIONS

"Dell EMC Powermax and VMAX All Flash: GDPS and Advanced Copy Services Compatibility," available at https://www.emc.com/collateral/software/white-papers/h11108-compatible-mc-features-wp.pdf, May 2018.

*Primary Examiner* — David Yi
*Assistant Examiner* — Craig S Goldschmidt
(74) *Attorney, Agent, or Firm* — Nelson and Nelson; Daniel P. Nelson; Alexis V. Nelson

(57) ABSTRACT

A method for improving I/O response times in a data replication environment is disclosed. In one embodiment, such a method includes receiving, at a primary storage system, a request to read data on the primary storage system. The method starts a timer upon receiving the request. In the event the data cannot be retrieved from the primary storage system by the time the timer expires, the method requests the data from a secondary storage system. In the event the primary storage system returns the data before the secondary storage system, the method returns data retrieved from the primary storage system to a host system. In the event the secondary storage system returns the data before the primary storage system, the method returns the data retrieved from the secondary storage system to the host system. A corresponding system and computer program product are also disclosed.

20 Claims, 5 Drawing Sheets

(51) Int. Cl.
  *G06F 13/20* (2006.01)
  *G06F 12/0866* (2016.01)
(52) U.S. Cl.
  CPC .......... *G06F 12/0866* (2013.01); *G06F 13/20* (2013.01); *G06F 2212/1024* (2013.01)

(56) References Cited

U.S. PATENT DOCUMENTS

| | | |
|---|---|---|
| 7,571,293 B1 | 8/2009 | LeCrone et al. |
| 7,809,884 B1 | 10/2010 | Linnell |
| 9,983,812 B1 | 5/2018 | Don et al. |
| 2006/0259725 A1 | 11/2006 | Saika et al. |
| 2009/0010248 A1* | 1/2009 | Kanai .................... H04L 45/00 370/352 |
| 2016/0342349 A1* | 11/2016 | Borlick ................ G06F 3/0689 |

\* cited by examiner

I/O RESPONSE TIMES IN DATA REPLICATION ENVIRONMENTS

BACKGROUND

Field of the Invention

This invention relates to systems and methods for improving input/output (I/O) response times in data replication environments.

Background of the Invention

In data replication environments such as Peer-to-Peer-Remote-Copy ("PPRC") environments, data is mirrored from a primary storage system to a secondary storage system to maintain two consistent copies of the data. The primary and secondary storage systems may be located at different sites, perhaps hundreds or even thousands of miles away from one another. In the event the primary storage system fails, I/O may be redirected to the secondary storage system, thereby enabling continuous operations. When the primary storage system is repaired, I/O may be redirected back to the primary storage system. The process of redirecting I/O from the primary storage system to the secondary storage system when a failure or other event occurs may be referred to as a swap or HyperSwap.

In data replication environments such as PPRC environments, I/O (i.e., reads and writes) may be directed to the primary storage system during normal operating conditions. The secondary storage system may only step in to replace the primary storage system when the primary storage system fails. Nevertheless, certain conditions may occur on the primary storage system that may fall short of a failure or HyperSwap, but may nevertheless significantly impact I/O response times for host systems accessing data on the primary storage system. For example, an error condition in a hard disk drive or solid state drive on the primary storage system may significantly delay I/O to a host system. In certain scenarios, it may take up to thirty seconds for a problematic hard disk drive or solid state drive to be removed from an array. This may delay I/O to a host system by up to thirty seconds, which is unacceptable in many environments.

In view of the foregoing, what are needed are systems and methods to improve I/O response times in data replication environments, such as PPRC environments. Ideally, such systems and methods will improve I/O response times when errors or other delay-causing events are occurring on the primary storage system.

SUMMARY

The invention has been developed in response to the present state of the art and, in particular, in response to the problems and needs in the art that have not yet been fully solved by currently available systems and methods. Accordingly, the invention has been developed to provide systems and methods for improving I/O response times in data replication environments. The features and advantages of the invention will become more fully apparent from the following description and appended claims, or may be learned by practice of the invention as set forth hereinafter.

Consistent with the foregoing, a method for improving I/O response times in a data replication environment is disclosed. In one embodiment, such a method includes receiving, at a primary storage system, a request to read data on the primary storage system. The method starts a timer upon receiving the request. In the event the data cannot be retrieved from the primary storage system by the time the timer expires, the method requests the data from a secondary storage system. In the event the primary storage system returns the data before the secondary storage system, the method returns data retrieved from the primary storage system to a host system. In the event the secondary storage system returns the data before the primary storage system, the method returns the data retrieved from the secondary storage system to the host system.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
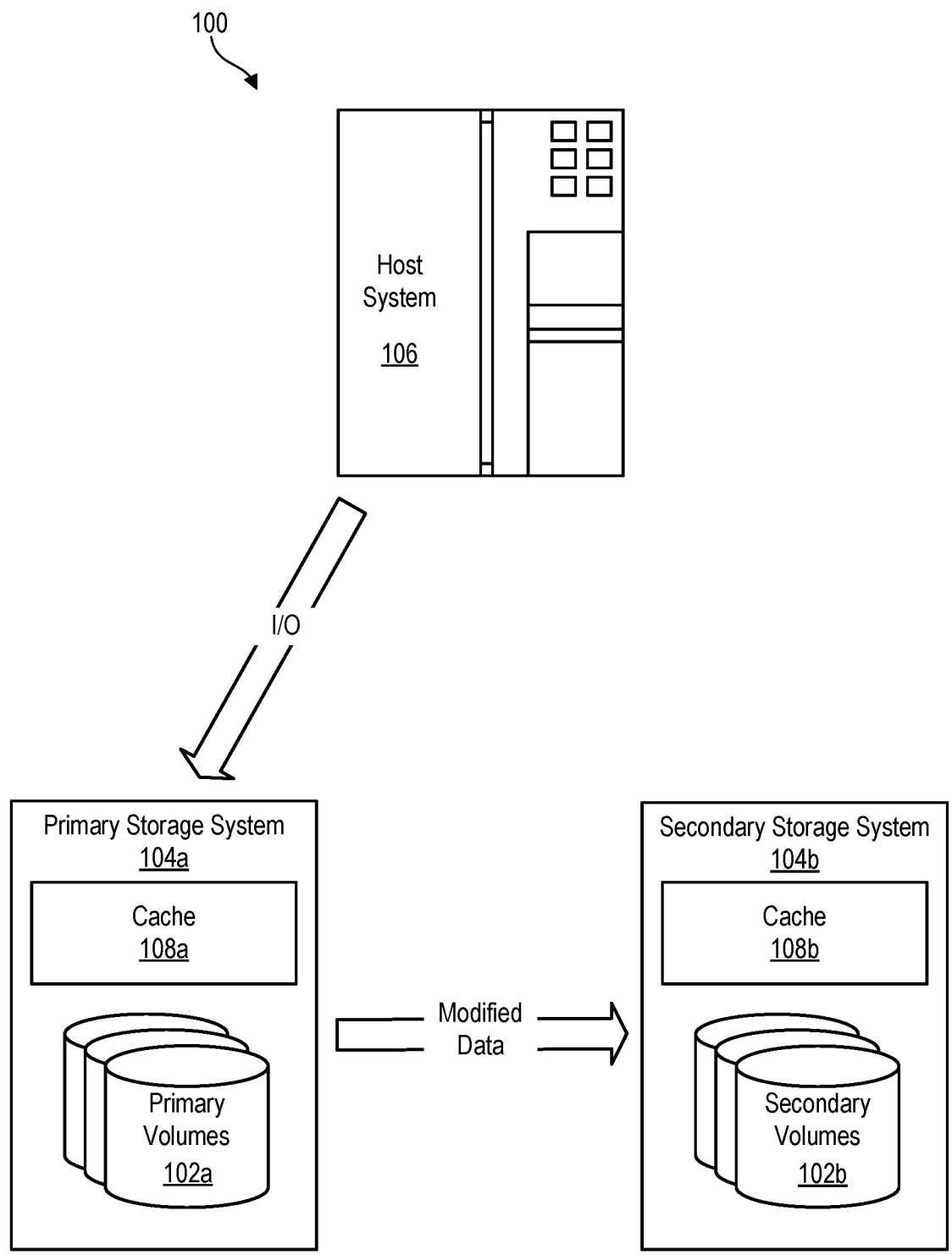
FIG. 1 is a high-level block diagram showing one example of a data replication environment, such as a Peer-to-Peer-Remote-Copy ("PPRC") environment.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Referring to FIG. 1, one example of a data replication system 100, such as a PPRC system 100, is illustrated. The data replication system 100 is presented to show an example of an architecture in which embodiments of the invention may operate, and is not intended to be limiting. In general, the data replication system 100 establishes a mirroring relationship between one or more primary volumes 102a and one or more secondary volumes 102b. Once this relationship is established, a consistent copy of data is maintained on the volumes 102a, 102b. The primary and secondary volumes 102a, 102b may be located on the same storage system 104, although the volumes 102a, 102b are typically located on separate storage systems 104a, 104b located some distance (e.g., several miles to thousands of miles) from one another. Channel extension equipment may be located between the storage systems 104a, 104b, as needed, to extend the distance over which the storage systems 104a, 104b may communicate.

The data replication system 100 may, in certain embodiments, be configured to operate in either a synchronous or asynchronous manner. For example, when operating synchronously, a write request may only be considered complete when it has completed successfully on both the primary and secondary storage systems 104a, 104b. By contrast, asynchronous operation may only require that the write complete on the primary storage system 104a before the write is considered complete. That is, a write acknowledgement may be returned to a host system 106 when the write has completed on the primary storage system 104a, without requiring that the write also be completed on the secondary storage system 104b. The write may then be mirrored from the primary storage system 104a to the secondary storage system 104b as time and resources allow to create a consistent copy on the secondary storage system 104b.

As shown in FIG. 1, each of the primary storage system 104a and secondary storage system 104b may include a cache 108a, 108b. Whenever a storage system 104 receives a read request from a host system 106, the storage system 104 may first check its cache 108 to determine whether the requested data is stored therein. If so, the storage system 104 may retrieve the data from its cache 108 and return it to the host system 106. If the data is not stored in its cache 108, the storage system 104 may fetch the data from its volumes 102 (typically disk and/or solid state drives), return the data to the host system 106, and save it in its cache 108 in the event it is requested again. If the data is requested again by a host 106, the storage system 104 may fetch the data from its cache 108 instead of fetching it from its volumes 102, saving both time and resources.

In a similar manner, when a storage system 104 receives a write request, the storage system 104 may store the write in its cache 108 and destage the write to its volumes 102 at a later time. The write may be considered complete when it is written to its cache 108 as opposed to when it is destaged to its volumes 102. In general, the cache 108 may accelerate reads and writes and generally enhance I/O performance.

In the event the primary storage system 104a fails, I/O may be redirected to the secondary storage system 104b to enable continuous operations. This process may be referred to as a swap or HyperSwap. Since the secondary storage system 104b contains a consistent copy of data on the primary storage system 104a, the redirected I/O (e.g., reads and writes) may be performed on the copy of the data on the secondary storage system 104b. When the primary storage system 104a is repaired or resumes operation, I/O may be redirected to the primary storage system 104a.

Figure 2:
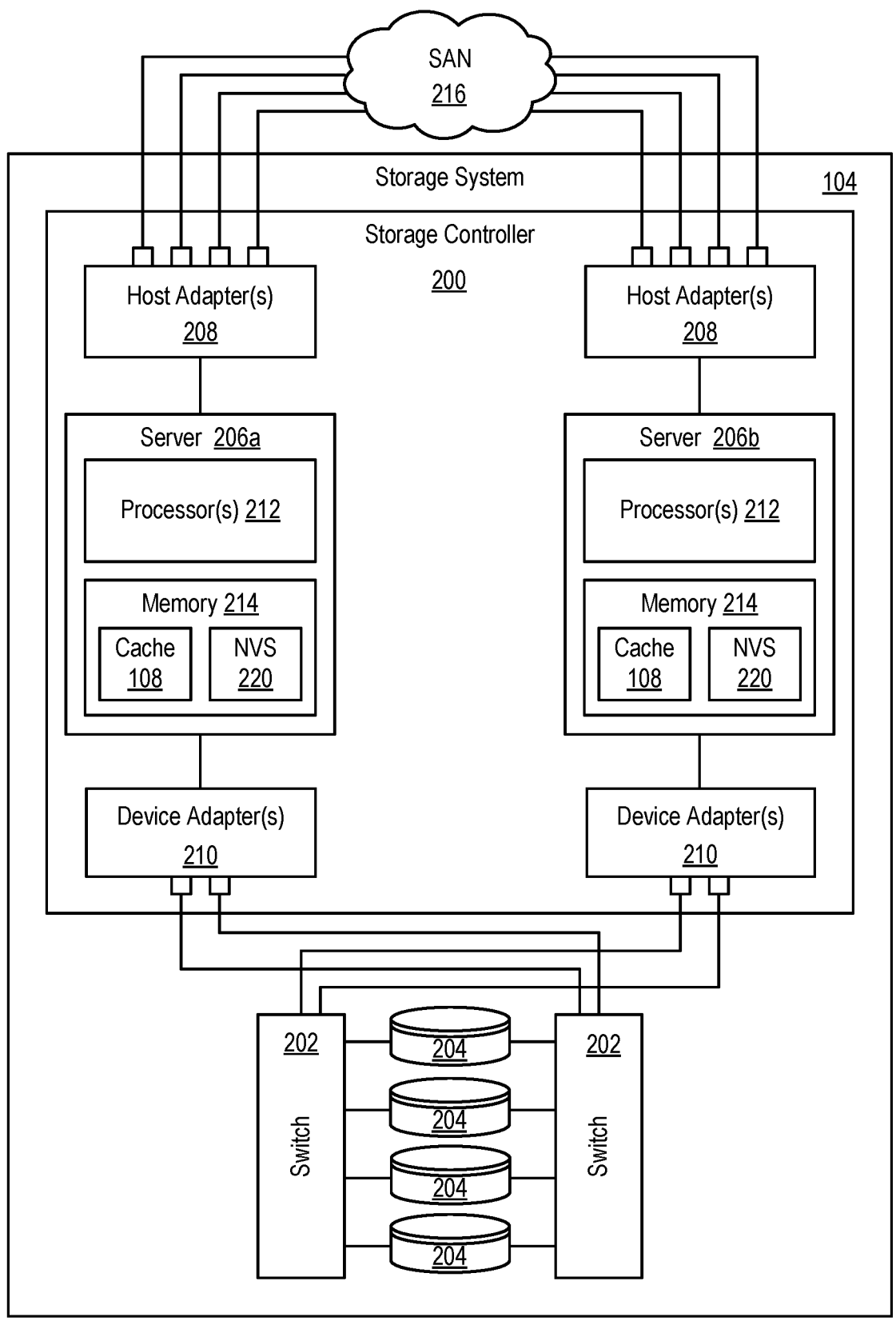
FIG. 2 is a high-level block diagram showing one embodiment of a storage system for use in the data replication environment of FIG. 1.

Referring to FIG. 2, one embodiment of a storage system 104 containing an array of storage drives 204 (e.g., hard-disk drives 204 and/or solid-state drives 204) is illustrated. Such a storage system 104 may be used in the data replication environment 100 illustrated in FIG. 1. The internal components of the storage system 104 are shown since the systems and methods disclosed herein may, in certain embodiments, be implemented within such a storage system 104, although the systems and methods may also be applicable to other storage systems.

As shown, the storage system 104 includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204. In certain embodiments, the one or more host systems 106 may communicate with the storage system 104 through a storage area network (SAN) 216.

In selected embodiments, the storage controller 200 includes one or more servers 206. The storage controller 200 may also include host adapters 208 and device adapters 210 to connect the storage controller 200 to host systems 106 and storage drives 204, respectively. During normal operation (when both servers 206 are operational), the servers 206 may manage I/O to different logical subsystems (LSSs) within the enterprise storage system 104. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes 102 in the storage drives 204.

In selected embodiments, the memory 214 includes the previously mentioned cache 108, such as a DRAM cache 108. Whenever a host 106 (e.g., an open system or mainframe server 106) performs a read operation, the server 206 that performs the read may fetch data from the storages drives 204 and save it in its cache 108 in the event it is required again. If the data is requested again by a host 106, the server 206 may fetch the data from the cache 108 instead of fetching it from the storage drives 204, saving both time and resources. Similarly, when a host 106 performs a write, the server 106 that receives the write request may store the write in its cache 108, and destage the write to the storage drives 204 at a later time. When a write is stored in cache 108, the write may also be stored in non-volatile storage (NVS) 220 of the opposite server 206 so that the write can be recovered by the opposite server 206 in the event the first server 206 fails.

One example of a storage system 104 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 104, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
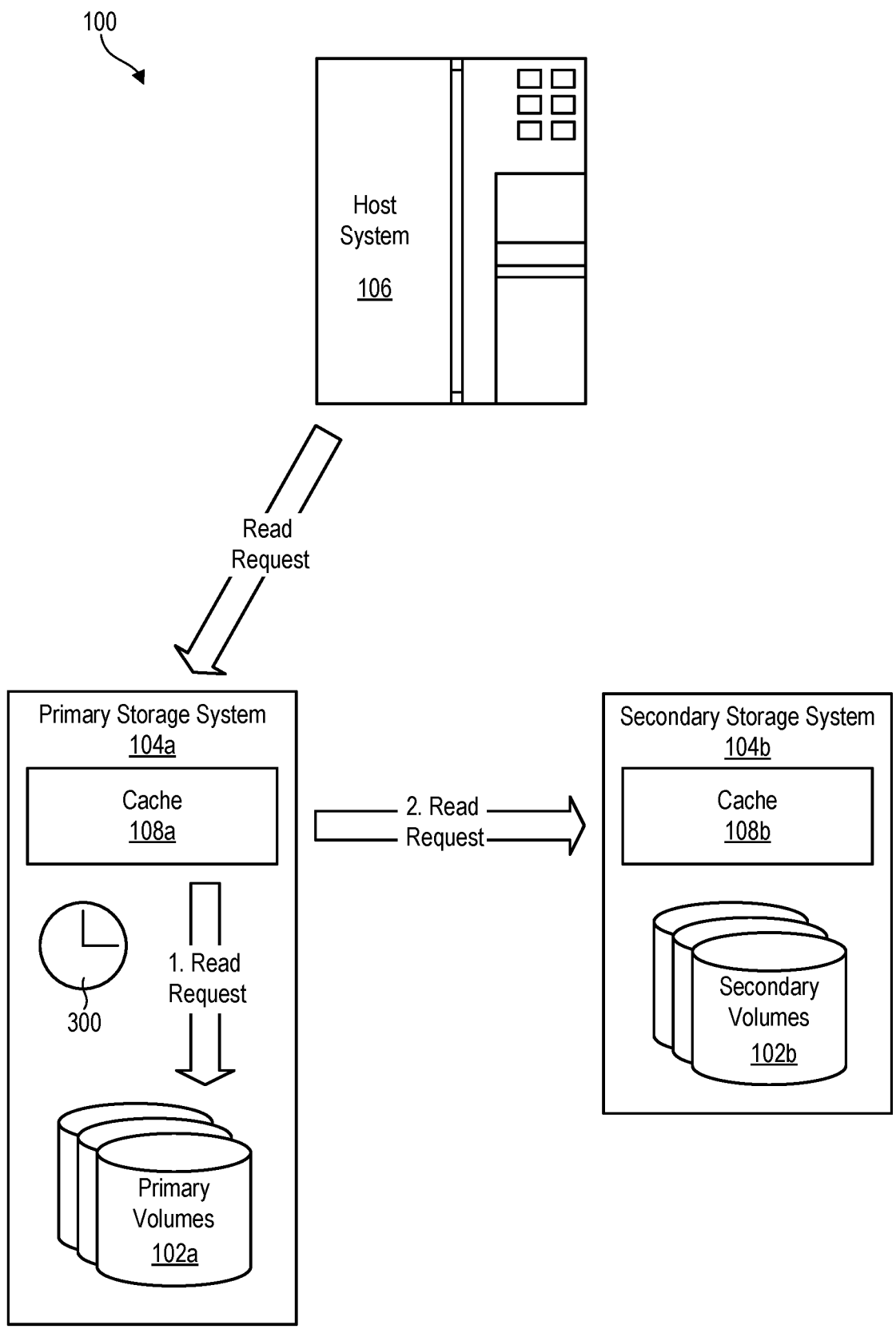
FIG. 3 is a high-level block diagram showing a technique for improving I/O response times in a data replication environment.

Referring to FIG. 3, as previously mentioned, in data replication environments 100 such as PPRC environments 100, I/O (i.e., reads and writes) may be directed to the primary storage system 104a during normal operating conditions. The secondary storage system 104b may only step in to replace the primary storage system 104a when the primary storage system 104a fails. Nevertheless, certain conditions may occur on the primary storage system 104a that may fall short of a failure or short of conditions needed to trigger a HyperSwap, but may nevertheless significantly impact I/O response times for host systems 106 accessing data on the primary storage system 104a. For example, an error condition in a hard disk drive 204 or solid state drive 204 on the primary storage system 104a may significantly delay I/O to a host system 106. In certain scenarios, it may take up to thirty seconds for a problematic hard disk drive 204 or solid state drive 204 to be removed from an array. This may delay I/O to a host system 106 by up to thirty seconds, which is unacceptable in many environments.

To address the above-described issues and scenarios, systems and methods are disclosed herein to improve I/O response times in data replication environments 100 such as PPRC environments 100. Such systems and methods will improve I/O response times when errors or other delay-causing events are occurring on the primary storage system 104a. As shown in FIG. 3, when a read request is received by the primary storage system 104a from a host system 106, the primary storage system 104a may initially check its cache 108a to determine if the requested data is stored therein. If the data is in cache 108a, the primary storage system 104a may retrieve the data from the cache 108a and return it to the host system 106.

If the data is not in the cache 108a, the primary storage system 104a may request the data from the primary volumes 102a. Upon requesting the data from the primary volumes 102a, the primary storage system 104a may start a timer 300. The timer 300 may be set to a value such as 300 ms depending on how long of a delay is deemed acceptable to receive data back from the primary volumes 102a. As previously mentioned, delays may be caused by error conditions in storage drives 204 or other components (host adapters 208, device adapters 210, communication links, server failures, etc.) on the primary storage system 104a. If the data is received from the primary volumes 102a before the timer 300 expires, the data may be stored in cache 108a and returned to the host system 106 without invoking any additional extraordinary measures.

If, on the other hand, the timer 300 expires and the data has still not been received from the primary volumes 102a, the primary storage system 104a may request the same data from the secondary storage system 104b. Since, in a data replication environment 100 such as a PPRC environment 100, the secondary volumes 102b contain a consistent copy of data in the primary volumes 102a, the data requested from the primary volumes 102a may also reside on the secondary volumes 102b. At this point, two read requests may be outstanding to retrieve the data: one request for the primary storage system 104a and one request for the secondary storage system 104b.

Figure 4:
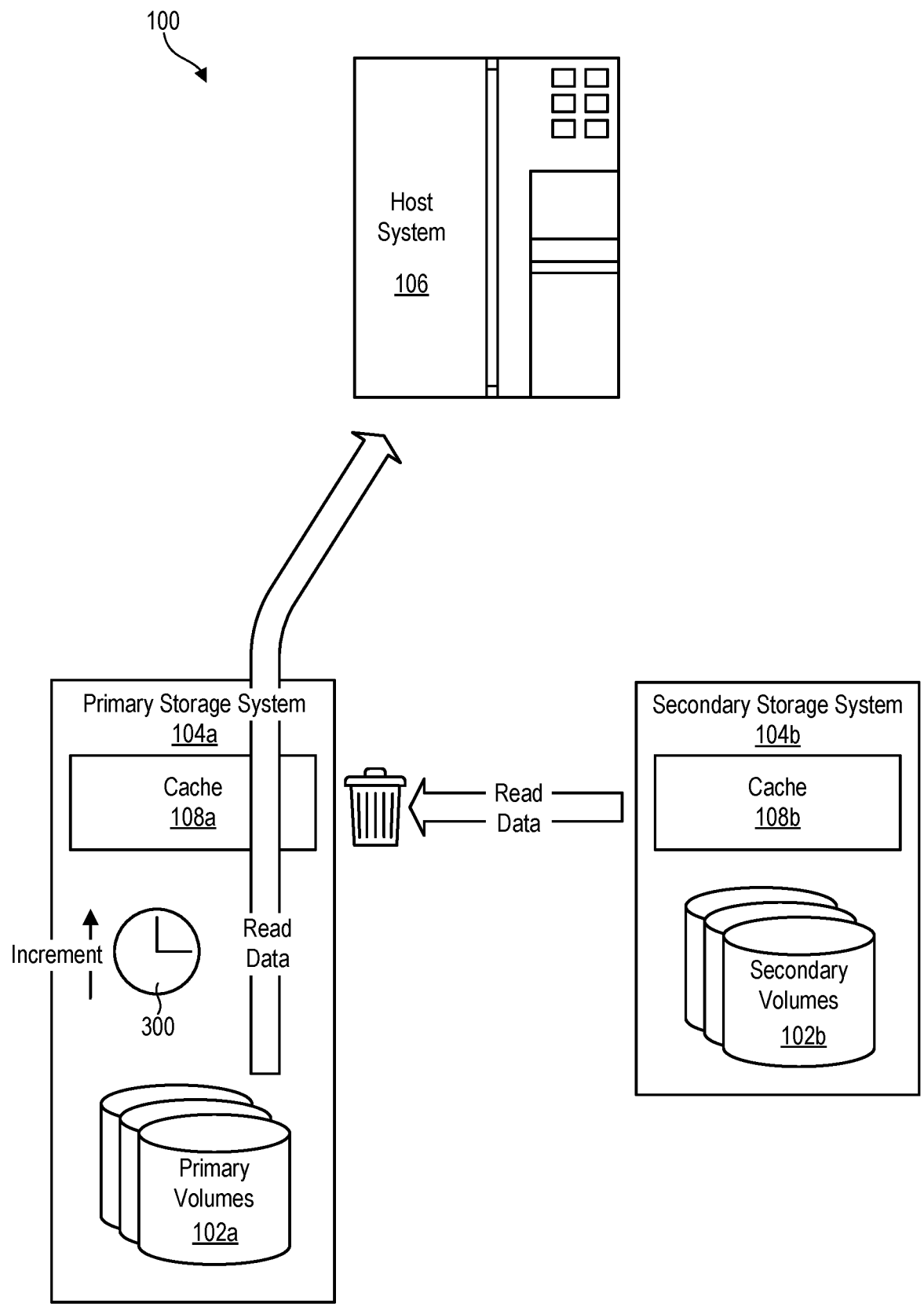
FIG. 4 is a high-level block diagram showing a first scenario where the primary storage system returns data before the secondary storage system.

Once the data is requested from both the primary volumes 102a and the secondary volumes 102b, the primary storage system 104a may wait for the data. If the data is received from the primary storage system 104a before it is received from the secondary storage system 104b, as shown in FIG. 4, the data received from the primary storage system 104a may be returned to the host system 106. In such a case, any data that is received from the secondary storage system 104b in response to the request may be ignored or discarded.

Figure 5:
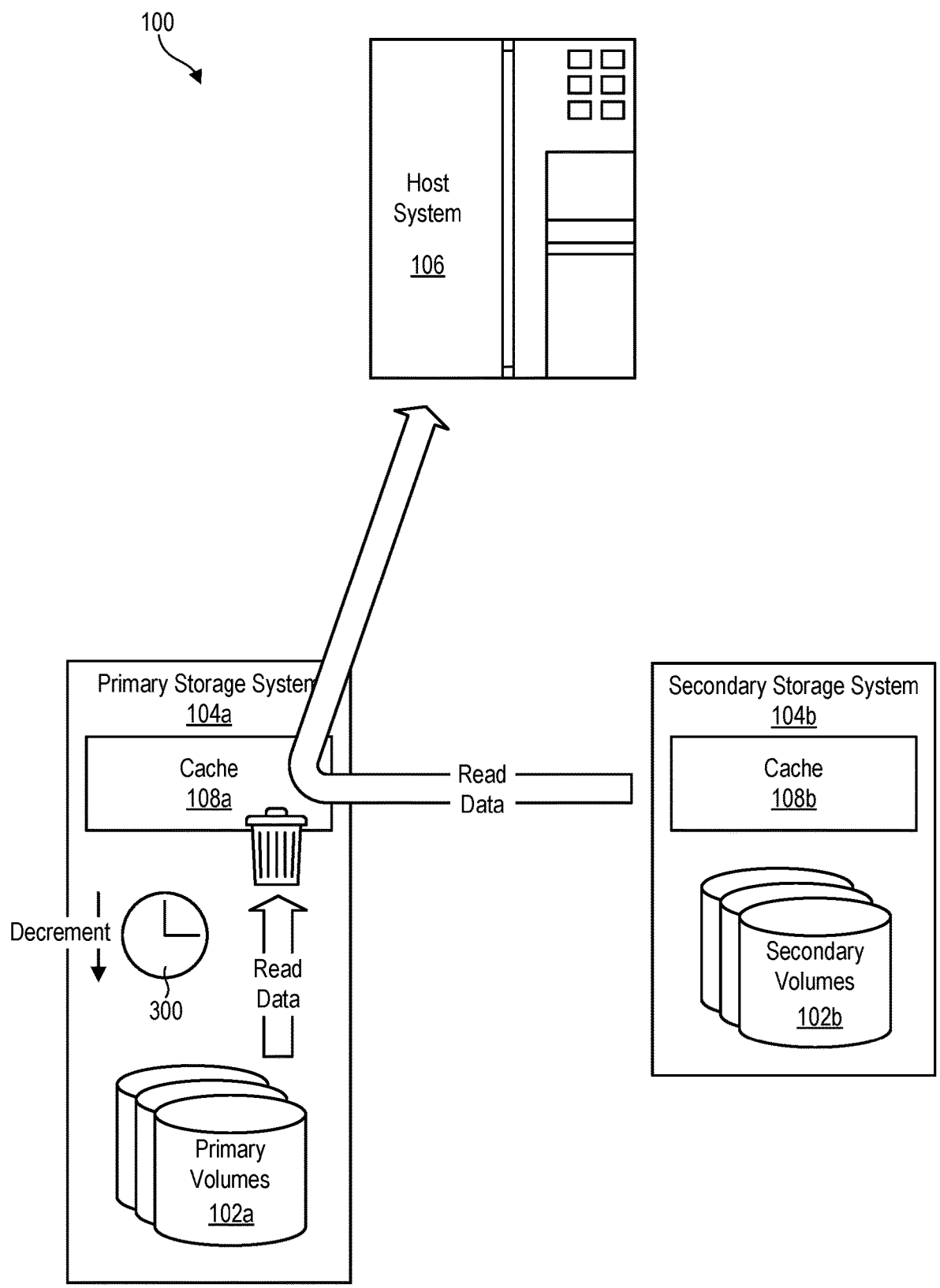
FIG. 5 is a high-level block diagram showing a second scenario where the secondary storage system returns data before the primary storage system.

If, on the other hand, the data is received from the secondary storage system 104b before it is received from the primary storage system 104a, as shown in FIG. 5, the data retrieved from the secondary storage system 104b may be returned to the host system 106. In such a case, any data that is received from the primary storage system 104a in response to the request may be ignored or discarded.

Upon returning the data to the host system 106, the data may also be stored in the cache 108a of the primary storage system 104a in the event the data is requested again. Because the data was also requested from the secondary storage system 104b, the data may also be stored in the cache 108b of the secondary storage system 104b in the event it is needed again.

As shown in FIG. 4, when the primary storage system 104a returns the data before the secondary storage system 104b, the timer 300 may be incremented. For example, if the timer 300 is set to 300 ms, the timer 300 may be incremented by 10 ms to 310 ms. This increases the amount time that the primary storage system 104a waits for a read request to be fulfilled on the primary storage system 104a before sending a second request to the secondary storage system 104b. In situations where the primary storage system 104a is returning data faster than the secondary storage system 104b, incrementing the timer 300 increases the amount of time that the primary storage system 104a waits before sending a read request to the secondary storage system 104b. Each time the timer 300 is invoked and the primary storage system 104a returns data faster than the secondary storage system 104b, the timer 300 may be incremented. The timer 300 may increase up to some designated maximum value, such as 500 ms. Thus, the timer 300 may be dynamically increased when the primary storage system 104a outperforms the secondary storage system 104b.

Similarly, as shown in FIG. 5, when the secondary storage system 104b returns the data before the primary storage system 104a, the timer 300 may be decremented. For example, if the timer 300 is set to 300 ms, the timer 300 may be decremented by 10 ms to 290 ms. This decreases the amount time that the primary storage system 104a waits for a read request to be fulfilled on the primary storage system 104a before sending a second request to the secondary storage system 104b. In situations where the secondary storage system 104b returns data faster than the primary storage system 104a, decrementing the timer 300 may improve I/O response times by reducing the amount of time that the primary storage system 104a waits before sending a read request to the secondary storage system 104b. Each time the timer 300 is invoked and the secondary storage system 104b returns the data before the primary storage system 104a, the timer 300 may be decremented. This may be repeated until reaching some designated minimum value, such as 100 ms. Thus, the timer 300 may be dynamically reduced when the secondary storage system 104b outperforms the primary storage system 104a.

The systems and methods disclosed herein may be executed in either synchronous or asynchronous data replication environments 100. In asynchronous data replication environments 100, some additional mechanism may be provided to ensure that data requested on the primary storage system 104a is also present on the secondary storage system 104b at the time of requesting it from the secondary storage system 104b.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for improving I/O response times in a data replication environment, the method comprising:
receiving, at a primary storage system from a host system, a request to read data on the primary storage system;
upon receiving the request, starting a timer configured to expire after a designated time period has elapsed;

in the event the data cannot be retrieved from the primary storage system by the time the timer expires, requesting, by the primary storage system, the data from a secondary storage system;

in the event the primary storage system returns the data before the secondary storage system, returning the data retrieved from the primary storage system to the host system;

in the event the secondary storage system returns the data before the primary storage system, returning the data retrieved from the secondary storage system to the host system; and modifying the designated time period for future requests to read data on the primary storage system based on which of the primary storage system and the secondary storage system is first to return the data.

2. The method of claim 1, further comprising, in the event the primary storage system returns the data before the secondary storage system, increasing the designated time period for future requests to read data on the primary storage system.

3. The method of claim 2, wherein increasing the designated time period comprises increasing the designated time period until a maximum value is reached.

4. The method of claim 1, further comprising, in the event the secondary storage system returns the data before the primary storage system, decreasing the designated time period for future requests to read data on the primary storage system.

5. The method of claim 4, wherein decreasing the designated time period comprises decreasing the designated time period until a minimum value is reached.

6. The method of claim 1, further comprising, in the event the primary storage system returns the data before the secondary storage system, discarding the data received from the secondary storage system.

7. The method of claim 1, further comprising, in the event the secondary storage system returns the data before the primary storage system, discarding the data received from the primary storage system.

8. A computer program product for improving I/O response times in a data replication environment, the computer program product comprising a computer-readable storage medium having computer-usable program code embodied therein, the computer-usable program code configured to perform the following when executed by at least one processor:

receive, at a primary storage system from a host system, a request to read data on the primary storage system;

upon receiving the request, start a timer configured to expire after a designated time period has elapsed;

in the event the data cannot be retrieved from the primary storage system by the time the timer expires, request, by the primary storage system, the data from a secondary storage system;

in the event the primary storage system returns the data before the secondary storage system, return the data retrieved from the primary storage system to the host system;

in the event the secondary storage system returns the data before the primary storage system, return the data retrieved from the secondary storage system to the host system; and modify the designated time period for future requests to read data on the primary storage system based on which of the primary storage system and the secondary storage system is first to return the data.

9. The computer program product of claim 8, wherein the computer-usable program code is further configured to, in the event the primary storage system returns the data before the secondary storage system, increase the designated time period for future requests to read data on the primary storage system.

10. The computer program product of claim 9, wherein increasing the designated time period comprises increasing the designated time period until a maximum value is reached.

11. The computer program product of claim 8, wherein the computer-usable program code is further configured to, in the event the secondary storage system returns the data before the primary storage system, decrease the designated time period for future requests to read data on the primary storage system.

12. The computer program product of claim 11, wherein decreasing the designated time period comprises decreasing the designated time period until a minimum value is reached.

13. The computer program product of claim 8, wherein the computer-usable program code is further configured to, in the event the primary storage system returns the data before the secondary storage system, discard the data received from the secondary storage system.

14. The computer program product of claim 8, wherein the computer-usable program code is further configured to, in the event the secondary storage system returns the data before the primary storage system, discard the data received from the primary storage system.

15. A system for improving I/O response times in a data replication environment, the system comprising:

at least one processor;

at least one memory device operably coupled to the at least one processor and storing instructions for execution on the at least one processor, the instructions causing the at least one processor to:

receive, at a primary storage system from a host system, a request to read data on the primary storage system;

upon receiving the request, start a timer configured to expire after a designated time period has elapsed;

in the event the data cannot be retrieved from the primary storage system by the time the timer expires, request, by the primary storage system, the data from a secondary storage system;

in the event the primary storage system returns the data before the secondary storage system, return the data retrieved from the primary storage system to the host system;

in the event the secondary storage system returns the data before the primary storage system, return the data retrieved from the secondary storage system to the host system; and modify the designated time period for future requests to read data on the primary storage system based on which of the primary storage system and the secondary storage system is first to return the data.

16. The system of claim 15, wherein the instructions further cause the at least one processor to, in the event the primary storage system returns the data before the secondary storage system, increase the designated time period for future requests to read data on the primary storage system.

17. The system of claim 16, wherein increasing the designated time period comprises increasing the designated time period until a maximum value is reached.

18. The system of claim 15, wherein the instructions further cause the at least one processor to, in the event the secondary storage system returns the data before the primary storage system, decrease the designated time period for future requests to read data on the primary storage system.

19. The system of claim 18, wherein decreasing the designated time period comprises decreasing the designated time period until a minimum value is reached.

20. The system of claim 15, wherein the instructions further cause the at least one processor to:
- in the event the primary storage system returns the data before the secondary storage system, discard the data received from the secondary storage system; and
- in the event the secondary storage system returns the data before the primary storage system, discard the data received from the primary storage system.

* * * * *